(No Model.)
F. S. INGOLDSBY.
WAGON BRAKE.
No. 551,317.
Patented Dec. 10, 1895.
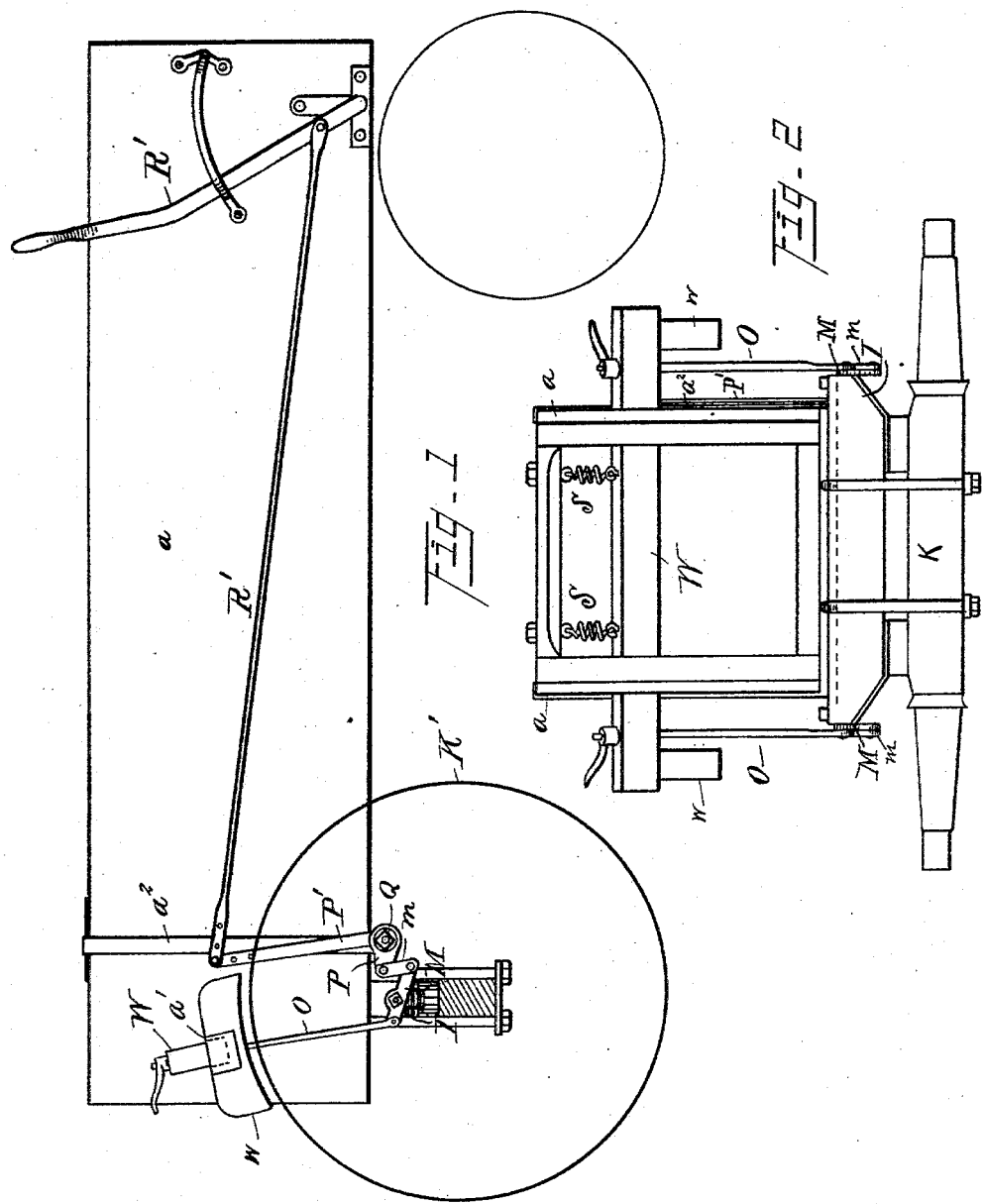
Witnesses.
F. Griswold
Helen M. Wood.
Inventor.
Frank S. Ingoldsby
By his attorney
E. L. Thurston

United States Patent Office.

FRANK S. INGOLDSBY, OF DENVER, COLORADO.

WAGON-BRAKE.

SPECIFICATION forming part of Letters Patent No. 551,317, dated December 10, 1895.

Application filed November 26, 1894. Serial No. 530,000. (No model.)

*To all whom it may concern:*

Be it known that I, FRANK S. INGOLDSBY, a citizen of the United States, residing at Denver, in the county of Arapahoe and State of Colorado, have invented certain new and useful Improvements in Brake Mechanism for Wagons and other Vehicles; and I do hereby declare the following to be a full, clear, and exact description of the invention, such as will enable others skilled in the art to which it appertains to make and use the same.

My invention relates to certain improvements in brake mechanism for wagons and other vehicles. The construction, mode of operation and advantages of my improved brake mechanism will be hereinafter described, and the novel features of construction and combinations of parts will be definitely pointed out in the claims.

In the drawings, Figure 1 is a side elevation of a wagon having my improved brake mechanism applied thereto, and Fig. 2 is a rear view of said wagon.

Referring to the parts by letters, $a$ $a$ represent the two sides of the wagon-box.

I represents the rear bolster; K, the rear axle, and K′ K′ the rear wheels.

In the sides $a$ $a$ are formed the slots $a'$. (Shown in dotted lines in Fig. 1.) These slots are formed just a little behind the rear axle and bolster, and, although approximately vertical, they do incline forward a little from top to bottom, the direction of said slots being substantially radial with respect to the wheels K′. The transverse brake-beam W lies and is movable up and down in said slots. The brake-shoes $w$ $w$ are secured to the projecting ends of said beam, and are adapted to bear upon the wheels K′ K′. Two springs S S are connected with the beam and the rear end of the box, and exert their force to lift the beam. The mechanism for operating said beam is as follows: A lever M is pivoted to the rear bolster. The rear end of this lever is connected with the brake-beam W by a rod O, which passes through said beam and has an adjustable nut upon its upper end. The other end of the lever is connected by a link $m$ to the lever-arm P, which is fast on a rock-shaft Q, said rock-shaft being mounted on the box, beneath which it passes transversely. This rock-shaft is preferably mounted in the lower ends of straps $a^2$, which are secured to the sides of the box, which straps have their ends bent over onto the top edges of said sides. The described lever system is found upon both sides of the wagon. On one side of the box the lever P′ lies, which is fixed to the rock-shaft Q, and the upper end of this lever is connected by a rod R with an operating-lever R′, which is pivoted to the side of the box within easy reach of the driver.

The above-described parts form a compound lever system, by means of which the brake-beam may be moved a short distance with great force. The springs S S withdraw the shoes from the wheels and take up all lost motion in the lever system and beam, whereby only a small movement of the lever system is necessary to move the shoes from a position where they do not touch the wheels to a position where they apply a powerful braking-pressure upon said wheels.

The lever M pivoted to the rear bolster and the rock-shaft mounted on the box and the described connections between said lever and rock-shaft form a combination of parts which binds the box and bolster together, and when the brakes are set effectually prevents any relative movement of said parts. It is not believed that this is true of any other brake mechanism. In all prior brake mechanisms, and particularly in those which employ one shoe on each wheel, the pressure of the brake-shoe upon the wheel tends to move the wheel and box in opposite directions, and to thereby weaken the effect of the braking-pressure on the wheel.

The position of the brake-shoes so that they bear upon the top of the wheel is regarded as important for these reasons, viz: When the brake is applied, the first effect produced is to lift the load from the hub of the wheel and transfer it to the top of the wheel, where the brake-shoes bear. This increases the leverage, acting in opposition to the friction on the ground tending to revolve the wheel. The tendency of action of the wheel against the brake-shoes is to draw said shoes forward, which movement would cause the shoes to press harder upon the wheels.

Another advantage due to the described position is this: that when the wagon is going downhill any "give" of the box causes the brake-shoe to press harder upon the wheel, and any "give" in the box when the wagon is going uphill causes the brake-shoes to move away from said wheel.

Having described my invention, I claim—

1. In a wagon, the combination of a wagon box, and bolster, with a transverse brake beam movable in guide slots, brake shoes carried by said beam and adapted to press against the wheels, and a compound lever system for operating the brake beam,—of which a part is pivoted to the box and a part to the bolster, substantially as and for the purpose specified.

2. In a wagon, the combination of the wagon box having slots in its sides which are placed above and a little behind the rear axle and are substantially radial with respect to the rear wheels, a brake beam movable in said slots, brake shoes on said beam, springs for raising the beam, and mechanism for moving said beam downward in said slots, substantially as and for the purpose specified.

3. In a wagon, the combination of the wagon box having guides for the brake beam, which are placed above and a little behind the rear axle and are substantially radial with respect to the rear wheels, a brake beam movable in said guides, brake shoes secured to said beam, and springs for raising said beam, with the rear bolster, levers pivoted to the ends of said bolster, rods connecting said levers and the brake-beam, levers pivoted to the box, links connecting said levers with the levers which are pivoted to the bolster, and mechanism for operating the levers on the box, substantially as and for the purpose specified.

4. In a wagon, the combination of the wagon box, having radial guides for the brake beam, a brake beam movable in said guides, the rear bolster, levers pivoted to said bolster, and rods connecting said lever with the brake beam, with straps secured to the sides of the box having their upper ends bent down upon the top edges of said sides, a rock shaft mounted in the lower ends of said straps, arms rigid with said rock shaft, links connecting said arms with the levers, and an operating arm rigid with said rock shaft, substantially as and for the purpose specified.

5. In a wagon, the combination of the wagon body and bolster, with a transverse brake beam movable in slots in the sides of the body, brake shoes carried by said beam, springs for raising the beam, levers pivoted to the ends of the bolster, rods connected at their lower ends with said levers, and having their upper ends passed through the brake beam, adjustable nuts on the ends of said rods, a rock shaft mounted beneath the body, having rigid arms, links connecting said arms with the said levers, and means for rocking said rock shaft, substantially as and for the purpose specified.

In testimony whereof I affix my signature in presence of two witnesses.

FRANK S. INGOLDSBY.

Witnesses:
JOHN T. PATTERSON,
MORGAN EDGAR.